US010902144B2

(12) United States Patent
Jho et al.

(10) Patent No.: US 10,902,144 B2
(45) Date of Patent: Jan. 26, 2021

(54) METHOD AND APPARATUS FOR SECURING DATA

(71) Applicant: Electronics and Telecommunications Research Institute, Daejeon (KR)

(72) Inventors: Nam-Su Jho, Daejeon (KR); Taek-Young Youn, Daejeon (KR); Dae Sung Moon, Daejeon (KR); Ik Kyun Kim, Daejeon (KR); Seung Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 185 days.

(21) Appl. No.: 16/113,530

(22) Filed: Aug. 27, 2018

(65) Prior Publication Data

US 2019/0065776 A1 Feb. 28, 2019

(30) Foreign Application Priority Data

Aug. 25, 2017 (KR) .................. 10-2017-0108233
Aug. 17, 2018 (KR) .................. 10-2018-0096360

(51) Int. Cl.
*G06F 21/00* (2013.01)
*G06F 21/62* (2013.01)
(Continued)

(52) U.S. Cl.
CPC ........ *G06F 21/6227* (2013.01); *G06F 21/606* (2013.01); *G06F 7/582* (2013.01)

(58) Field of Classification Search
CPC ..... G06F 21/6227; G06F 21/606; G06F 7/582
See application file for complete search history.

(56) References Cited

U.S. PATENT DOCUMENTS 5,412,730 A * 5/1995 Jones ................ H04L 9/12
380/262
6,829,367 B1 * 12/2004 Toyokawa ............ G06F 21/64
380/202

(Continued)

FOREIGN PATENT DOCUMENTS

JP 5594828 B2 9/2014
KR 10-2009-0052130 A 5/2009

(Continued)

OTHER PUBLICATIONS

Bowers, Kevin D. et al., "HAIL: A High-Availability and Integrity Layer for Cloud Storage." *Proceedings of the 16th ACM Conference on Computer and Communications Security*. ACM, 2009 (12 pages in English).

*Primary Examiner* — Ghodrat Jamshidi
(74) *Attorney, Agent, or Firm* — NSIP Law

(57) ABSTRACT

In the present invention, by providing an apparatus for securing data comprising a memory for storing information for data processing, a processor configured to partition original data into a plurality of partial data and generate a plurality of divided data by randomly determining positions of each of the plurality of partial data within the original data, and a communication interface configured to transmit each of the plurality of divided data to each of a plurality of servers, respectively, if an attacker obtains a portion of the divided data, it prevents the entire original data from being restored, and the legitimate user can restore the original data accurately even if some divided data is corrupted, and provides an efficient data polymorphic dividing technique that can minimize the amount of calculation required to secure data.

4 Claims, 6 Drawing Sheets

(51) Int. Cl.
*G06F 21/60* (2013.01)
*G06F 7/58* (2006.01)

(56) References Cited

U.S. PATENT DOCUMENTS

| | | | | |
|---|---|---|---|---|
| 10,592,695 B1* | 3/2020 | Ledet | .................... | H04L 51/063 |
| 2002/0199099 A1* | 12/2002 | Shirai | .............. | G11B 20/00333 |
| | | | | 713/160 |
| 2003/0012406 A1* | 1/2003 | Iwamura | ............ | H04N 1/32208 |
| | | | | 382/100 |
| 2005/0018871 A1* | 1/2005 | Pun | .................... | H04N 1/32149 |
| | | | | 382/100 |
| 2006/0153421 A1* | 7/2006 | Tachibana | .......... | H04N 1/32229 |
| | | | | 382/100 |
| 2007/0160198 A1* | 7/2007 | Orsini | ................. | H04L 63/0428 |
| | | | | 380/28 |
| 2012/0072731 A1* | 3/2012 | Winograd | ............. | G09C 5/00 |
| | | | | 713/176 |
| 2012/0084622 A1* | 4/2012 | D'Abreu | ............. | G06F 11/1048 |
| | | | | 714/755 |
| 2012/0201383 A1* | 8/2012 | Matsuo | ............... | H04L 63/0428 |
| | | | | 380/255 |
| 2012/0331088 A1* | 12/2012 | O'Hare | ............... | G06F 21/6227 |
| | | | | 709/214 |
| 2013/0051556 A1* | 2/2013 | Myung | ..................... | H04L 9/00 |
| | | | | 380/252 |
| 2013/0117273 A1 | 5/2013 | Lee et al. | | |
| 2014/0314237 A1* | 10/2014 | Cottrell | ............... | H04L 65/4076 |
| | | | | 381/2 |
| 2015/0088842 A1 | 3/2015 | de la Torre et al. | | |
| 2015/0156817 A1* | 6/2015 | Paz | ......................... | H04W 8/22 |
| | | | | 455/558 |
| 2015/0222913 A1* | 8/2015 | Sato | ..................... | H04N 19/187 |
| | | | | 375/240.25 |
| 2017/0061138 A1* | 3/2017 | Lambert | ............. | H04L 63/0428 |
| 2017/0153956 A1 | 6/2017 | Tian | | |
| 2017/0192964 A1 | 7/2017 | Park et al. | | |
| 2018/0341551 A1* | 11/2018 | Regni | ............... | H03M 13/3761 |

FOREIGN PATENT DOCUMENTS

| | | |
|---|---|---|
| KR | 10-1441059 B1 | 9/2014 |
| KR | 10-2014-0134796 A | 11/2014 |
| KR | 10-2015-0107062 A | 9/2015 |

* cited by examiner

METHOD AND APPARATUS FOR SECURING DATA

CROSS-REFERENCE TO RELATED APPLICATION

This application claims priority to and the benefit of Korean Patent Application Nos. 10-2017-0108233 and 10-2018-0096360 filed in the Korean Intellectual Property Office on Aug. 25, 2017 and Aug. 17, 2018, the entire contents of which are incorporated herein by reference.

BACKGROUND OF THE INVENTION

(a) Field of the Invention

The present invention relates to a method and apparatus for securing data.

(b) Description of the Related Art

In an IoT-based big data environment where information on all human lives are gathered and used, attack techniques for data collected on servers are becoming more intelligent and diverse. Known countermeasures against existing attack techniques have limitations in completely preventing threats to data. In addition, as can be seen from the frequent occurrences of personal information leakage, it is very difficult to prevent hacking at its source. Further, an attacker may even gain authority over the server in which the data is managed through hacking.

As a technique to fundamentally defend against attacks on data and leakage of data, various types of encryption technologies have been studied. For example, there are searchable encryption technology, order preservation encryption technology, encrypted data deduplication technology and data ownership management technology, and provision of additional function to utilize cryptographic data based on data encryption is the main research topic have. However, the encryption-based securing techniques such as the above example have a drawback in which the application range is limited because of the restriction on utilizing the stored data, and the data destruction attacks such as the recent Ransomware are disabled.

On the other hand, research related to the verifying status of stored data in the server is also being studied. Typically, there are PDP (Provable Data Possession) and PoR (Proof of Retrievability) technologies. While the PDP technology provides only the presence of the data that the server actually stores, the PoR technology provides a restoration function for the original data if some data is corrupted. Data restoration technology of PoR technology is based on technique of applying error correcting code (ECC).

The terminal (data owner) processes its own data and generates recoverable encoded data even if some of the encoded data is corrupted. Various error correcting codes are used for these encoding techniques. These encoded data provide the original data restoration function for corruption of some of the data, and serve a function for data securing for network transmission errors and physical errors in some parts of a disk.

However, since an attacker can damage all data stored in the server when an attacker gains privileges of a specific server through an attack such as hacking, the general technique of the error correction code cannot cope with such an attack. In addition, since the error correction code does not guarantee confidentiality of the data, there is a drawback that the original data can be easily restored if all encoded data is obtained by the attacker. Particularly, in case of ransomware which is a recent problem, it is difficult to prevent the ransomware attack by applying the general error correction code because it destroys all data of the attacked server.

In other words, the data encryption technology provides the ultimate securing function for the data stored in the server, but it has the problem of deteriorating the data utilization and does not provide a solution for data corruption attack such as ransomware.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention are provided to solve the problem of security for divided data stored in the server and usability of divided data.

An exemplary embodiment of the present invention provides an apparatus for securing data, comprising: a memory for storing information for data processing; a processor configured to partition original data into a plurality of partial data, and generate a plurality of divided data by randomly determining positions of each of the plurality of partial data within the original data; and a communication interface configured to transmit each of the plurality of divided data to each of a plurality of servers, respectively.

The processor replaces positions of different partial data among the plurality of partial data.

The processor obtains a secret key stored in the memory, generates a pseudo-random number using the secret key, and randomly determines positions of the plurality of partial data using the pseudo-random number.

The processor obtains encoded data by applying an error correcting code (ECC) to the original data, generates a plurality of noise pieces using the secret key, randomly inserts the noise pieces to the encoded data, divides the encoded data into a plurality of encoded partial data, and generates plurality of divided data by randomly determining the position of the plurality of encoded partial data.

The processor generates a noise string by using the secret key, and determines positions where the noise pieces are to be inserted and values of the noise pieces based on the noise string.

The communication interface receives the plurality of divided data from the plurality of servers, and the processor restores positions of the plurality of partial data included in the plurality of divided data to positions before being changed within the original data.

The processor removes the plurality of noise pieces from the plurality of divided data by using the secret key.

DETAILED DESCRIPTION OF THE EMBODIMENTS

Figure 1:
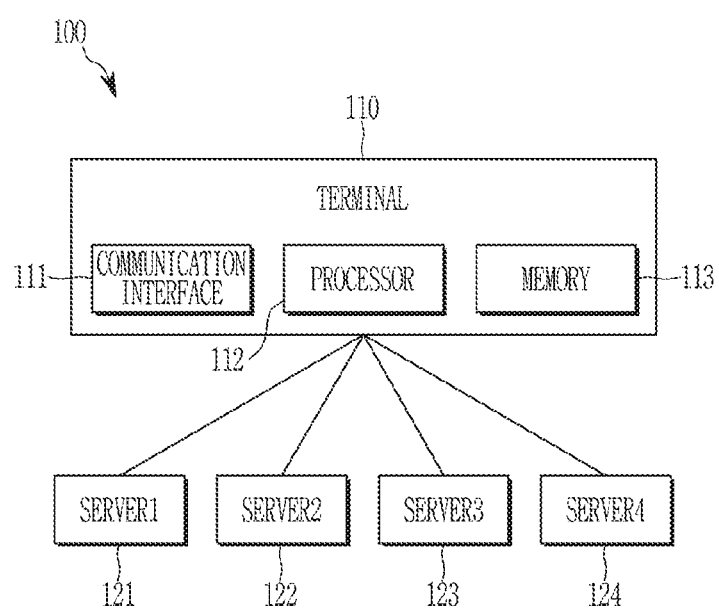
FIG. 1 shows an exemplary embodiment of the system for securing data according to the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Similar reference numerals designate like elements throughout the specification.

FIG. 1 shows an exemplary embodiment of the system for securing data according to the present invention.

As shown in FIG. 1, an exemplary embodiment of the present invention, a system for securing data 100 may include a terminal 110 that owns data, and a plurality of servers 121, 122, 123, and 124 that store data. The terminal 110 may include a communication interface 111, a memory 113, and a processor 112 for controlling the memory 113 and the communication interface 111.

The communication interface 111 may configure a communication method (e.g., wireless communication) with each of the servers 121, 122, 123, and 124 and transmit data to the respective servers 121, 122, 123, and 124 by using the configured communication method.

The memory 113 may obtain data from the outside and store the data. The memory 113 may store information (e.g., a secret key, etc.) for processing data according to the method for securing data of the present invention.

The processor 112 may process and divide the stored data in the memory 113 and transmit it to each of the servers 121, 122, 123, and 124. For this, the processor 112 may apply an error correcting code (ECC) to the data stored in the memory 113, divide the encoded data to which the error correcting code is applied, and transmit the divided data to each of the servers 121, 122, 123, and 124. For encoding the stored data, various error correcting code applying techniques are used, and the present invention is not limited to a specific error correcting code applying technique.

Each of the servers 121, 122, 123, and 124 may store each divided data in a storing device (not shown) included in each server.

When a request for each divided data is obtained from the terminal 110 after storing the divided data received from the terminal 110, each of the servers 121, 122, 123, and 124 may transmit each divided data to the terminal 110. The terminal 110 may restore the original data by combining the received divided data.

Figure 2:
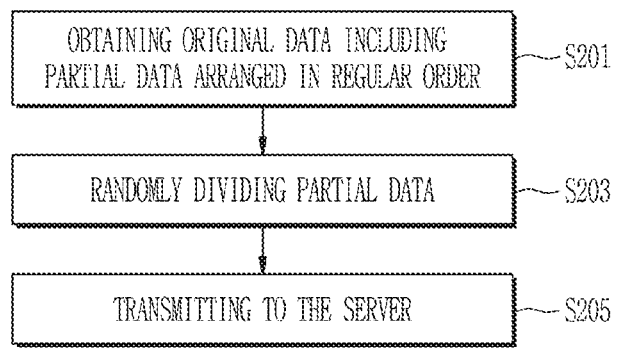
FIG. 2 shows a flowchart illustrating a data dividing method according to an embodiment of the present invention.

FIG. 2 shows a flowchart illustrating a data dividing method according to an embodiment of the present invention.

As shown in FIG. 2, an exemplary embodiment of the present invention may include an original data obtaining step S201, a dividing step S203, and a data transmitting step S205.

In step S201, a terminal (e.g., the terminal 110 in FIG. 1) may obtain original data in which plurality of partial data are arranged in a regular order.

First, the processor 112 may obtain a secret key (SK) of X bits from the memory 113 for use in processing the data.

Then, the processor 112 may select the values of variables S (first variable), L (second variable), K (third variable), and N (fourth variable). S (first variable) represents the number of servers to store original data. L (second variable) represents the size of a minimum unit bit column for processing the original data. That is, the processor 112 defines the bit string of L bits as one character included in the partial data. The processor 112 partitions the original data into partial data of the L-bits unit. K (third variable) is a variable for an error correcting code, and represents the number of partial data included in one block data. That is, one block data includes a bit string of K*L bits, where K*L is defined as a product of a number of partial data included in one block data K and a minimum unit bit string size per partial data L, and the entire bits of the original data may be a multiple of K*L. N (fourth variable) is a variable for the error correcting code, and it is used for determining an error correcting range (error-correction bound), and is determined from the desired error correcting range and K (third variable). N (fourth variable) is generated based on the error correcting code.

The processor 112 generates encoded data including a plurality of blocks including N partial data by applying the error correcting code to the original data. That is, each block including KL bits is extended to NL bits, so that the length of the entire encoded data is extended by a ratio of N/K as compared with the original data.

The processor 112 may insert noise pieces generated according to an exemplary embodiment of the present invention into the encoded data.

In step S203, the processor 112 may generate a plurality of divided data by randomly dividing partial data.

For example, the processor 112 may partition original data into a plurality of partial data, randomly determine positions of each of the plurality of partial data, and generate a plurality of divided data using the plurality of partial data.

For example, the encoded data F' generated by inserting the noise pieces is defined as F'=F'[1]||F'[2]||F'[3]|| . . . F'[S]||F'[S+1]||F'[S+2] . . . . Each F'[i] is defined as partial data.

For example, the processor 112 may determine a dividing method for storing each partial data in the server.

For example, the processor 112 may select a sequentially dividing method. The sequentially dividing method is a method in which the processor 112 transmits the plurality of partial data including partial data of an L-bits length to each server, based on the pre-determined regular order of the plurality of partial data within the original data.

In the sequentially dividing method, the processor 112 may include every S-th partial data as F'[1]||F'[S+1]|| . . . ||F'[tS+1]|| . . . into a first divided data F'1, to be transmitted to a first server. Likewise, the processor 112 may include partial data F'a=F'[a]||F'[S+a]||F'[tS+a]|| . . . into a-th divided data to be transmitted to an a-th server.

Also, unlike the sequentially dividing method described above, the processor 112 may determine a randomly dividing method.

For example, according to the randomly dividing method, the processor 112 may obtain a function P by using a pseudo-random number generating function. Function P is defined as a function that generates a fixed bit sequence that is not cryptographically distinguishable from the random bit sequence by using a secret key (SK) obtained from the memory 113. The function P can be generated by using the one-way nature of the code-based technique such as a hash function, symmetric key cryptography, and so on.

P is defined as P: $\{0,1\}^X \rightarrow \{1, 2, \ldots, S\}$, and X can be defined as a length of the secret key (SK).

The terminal may transmit i-th partial data F'[i] among F'=F'[1]||F'[2]||F'[3]|| ... F'[S]||F'[S+1]||F'[S+2]|| ... to a P(SK+i)-th server. That is, the index set A={i|P(SK+i)=a} is A={a1, a2, a3, ... }, and the a-th partial data F'a includes F'[a1]||F'[a2]||F'[a3]|| ....

If the function P is a cryptographically secured pseudo-random function and the original data F has sufficient length (e.g., a size greater than a predetermined bit), then the amount of partial data stored in each server is similarly divided.

In step S205, the processor 112 may transmit a plurality of divided data to servers (e.g., servers 121, 122, 123, and 124 of FIG. 1). The processor 112 may transmit the divided data, and remove the divided data stored in the memory 113, and the server 120 may store the transmitted divided data.

Figure 3:
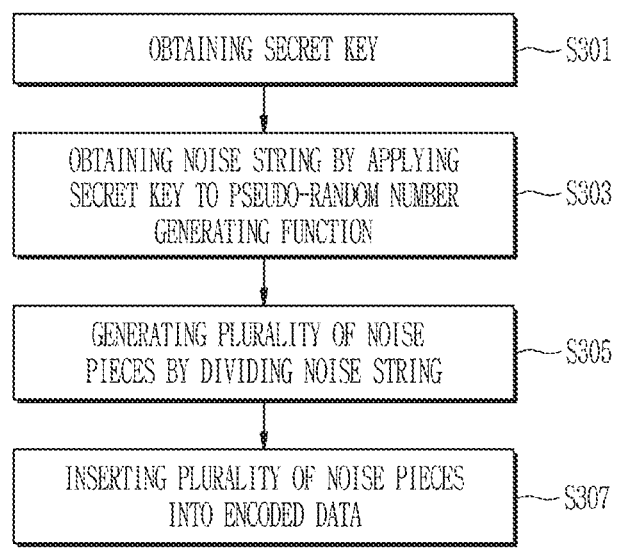
FIG. 3 shows a flowchart illustrating a method of inserting noise pieces according to an exemplary embodiment of the present invention.

FIG. 3 shows a flowchart illustrating a method of inserting noise pieces according to an exemplary embodiment of the present invention.

As shown in FIG. 3, in step S301, the processor 112 may obtain encoded data and obtain a secret key stored in the memory 113. First, the processor 112 may encode data EF=EF [1]||EF [2]||EF [3]|| ..., |EF [i]|=L, and then obtain the secret key to insert noise pieces into the encoded data.

In step S303, the processor 112 may generate the noise string by applying a secret key to a pseudo-random number generating function. First, the processor 112 determines a pseudo-random number generating function P. Here, P is defined as a function to generate the noise string from the given secret key (SK), and is defined as P: $\{0,1\}^X \rightarrow \{0,1\}^*$ for convenience. The processor 112 generates the noise string RT=P (SK) from the secret key (SK).

In step S305, the processor 112 may generate a plurality of noise pieces by dividing the noise string. The processor 112 may select variable Y, and generate noise pieces by dividing the noise string RT=j1||v1||j2||v2||j3||v3 .... Each j is defined as a Y-bits noise string, and each v is defined as an L-bits noise string. The processor 112 generates a set of noise pieces RS={(j1, v1), (j2, v2), (j3, v3) ... } from the noise string RT.

At step S307, the processor 112 may insert the noise pieces into the encoded data. First, the processor 112 defines an INS function. When inserting element (j, v) in EF=EF [1]||EF[2]||EF[3]|| ..., the processor 112 changes the value of EF[i] to a value of EF[i−1] for all of i>j of INS(EF, (j, v)), and inserts value of v into EF[j]. That is, the processor 112 inserts a noise piece having a value of v at the position of the j-th partial data, and increases the index of the entire partial data thereafter by one. The processor 112 inserts from the first element of the noise pieces RS sequentially to the encoded data, and performs INS(EF, (j1, v1)) for the first element (j1, v1) inserted initially. The processor 112 may insert the second element and entire elements after the second element among the noise pieces into the encoded data by accumulating the first index of each element. In other words, the processor 112 performs INS(EF, j1+j2, v2)) for the second element (j2, v2), and performs INS(EF, j1+j2+ ... +ji, vi)) for (ji, vi).

The processor 112 may divide the encoded data F' where the noise pieces are inserted according to the dividing method described through FIG. 2, and transmit it to the server.

On the other hand, since the method of inserting each noise piece into the encoded data described above may increase the amount of calculation of the terminal, the processor 112 may change the value of EF[j] into v for one partial data (j, v), and not change values of other partial data.

Figure 4:
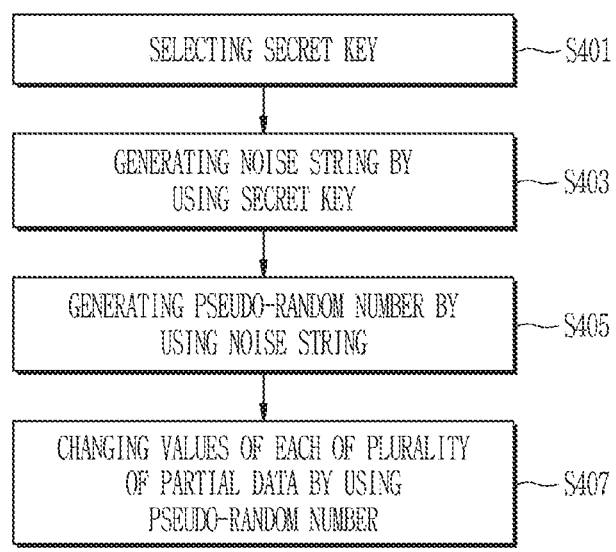
FIG. 4 shows a flowchart of data replacement according to the present invention.

FIG. 4 is an illustrative flowchart of data replacement according to the present invention.

As shown in FIG. 4, in step S401, the processor 112 may select the secret key, and in step S403, the processor 112 may generate the noise string by using the secret key. The processor 112 determines a pseudo-random number generating function P. P is defined as P: $\{0,1\}^X \rightarrow \{0, 1, \ldots, M\}$. M is defined as a number of all partial data included in F'=F'[1]||F'[2]||F'[3]|| ... ||F[M].

In step S405, the processor 112 may generate a pseudo-random number Pi by using the noise string. The processor 112 may generate a pseudo-random number Pi=P(SK+i) by applying the noise string to a pseudo-random number generating function.

In step S407, the processor 112 may change the data value of each partial data using the pseudo-random number. More specifically, the processor 112 may change the position of each partial data. The processor 112 may interchange the position of the values of the partial data F'[i] and partial data F'[Pi]. The processor 112 may change the value of F'[i] to F'[Pi], and change the value of F'[Pi] to F'[i].

Figure 5:
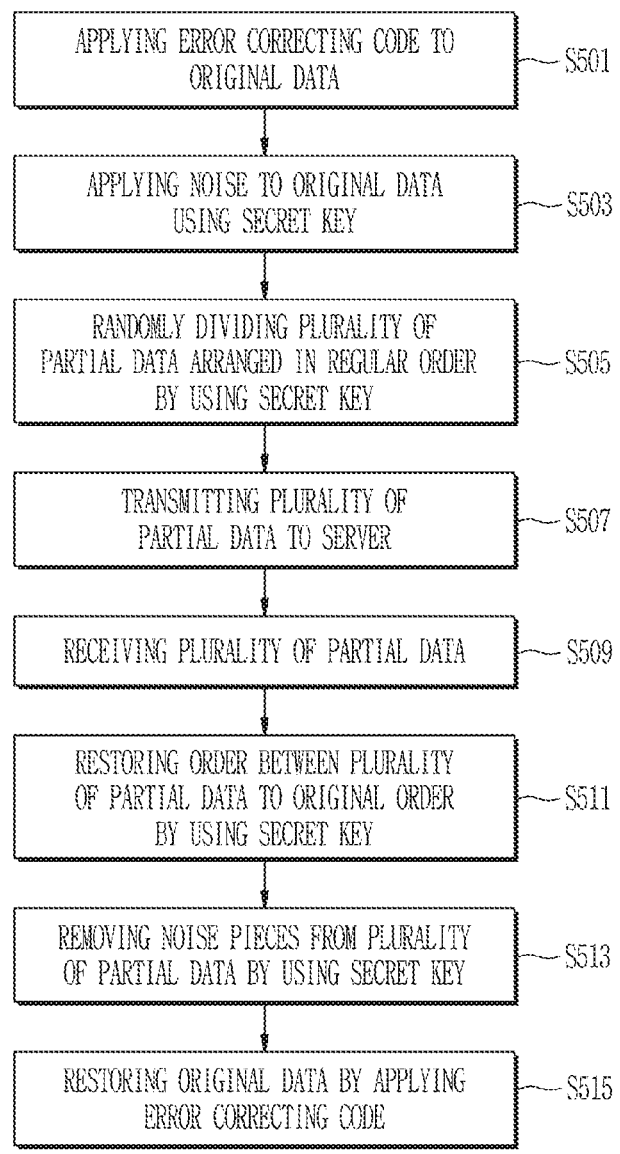
FIG. 5 shows a flowchart illustrating a data restoration method according to an embodiment of the present invention.

FIG. 5 shows a flowchart illustrating a data restoration method according to an embodiment of the present invention.

As shown in FIG. 5, in step S501, the processor 112 may apply the error correcting code to the original data, in step S503, the processor 112 may apply noise to the encoded data generated by applying the error correcting code to the original data by using the secret key, in step S505, the processor 112 may randomly divide a plurality of partial data arranged in a regular order by using the secret key, and in step S507, the processor 112 may transmit the plurality of divided data including the plurality of partial data to the plurality of servers.

After the processor 112 has divided the original data and transmitted it to each of the plurality of servers by the steps from step S501 to step S507, in step S509, the processor 112 may receive a plurality of partial data included in the plurality of divided data from the plurality of servers.

In step S511, the processor 112 may restore the original order of the plurality of partial data within the original data by using the secret key. If the data is divided by using sequentially dividing method, the processor 112 combines a-th partial data F'a=F'a [1]||F'a [2]||F'a [3] ... stored in a-th server and reconstructs as F''=F'1 [1]||F'2 [1]||F'3 [1]|| ... ||F'S [1]||F'1 [2]|| .... If the randomly dividing method is applied, the processor 112 performs restoring by using the secret key (SK) which is the same as the secret key used for generating the pseudo-random number generating function P: $\{0,1\}^X \rightarrow \{1, 2, \ldots, S\}$ used for randomly dividing. For example, the processor 112 obtains the first partial data of F' by calculating P(SK+1)=a, and configures the value of F'a[1] which is the first partial data of F'a to F'[1], and removes F'a[1] from F'a. Similarly, the processor 112 obtains i-th partial data F'[i] by calculating P(SK+i) and obtaining first partial data of F'ai. This process can be repeated from F'[1] to F'[M] to reconstruct the entire F'.

In step S513, the processor 112 constructs the encoded data by removing the noise pieces from F'. For example, if a noise piece is inserted between partial data, the processor 112 generates the same noise string RT=P(SK) by using the same P and the same secret key (SK) used in step S503. In addition, the processor 112 obtains the encoded data by repeating dividing the noise string RT into noise pieces RS={(j1, v1), (j2, v2), (j3, v3), ... }, performing removing the noise pieces from the partial data from the element by removing noise pieces RS from the last element as opposed to the noise piece inserting step (step S503), removing the piece of F'[j1+j2+ji] for the element (ji, vi), and decreasing the index of the entire partial data by one.

In step S515, the processor 112 may obtain the original data by applying an error correcting code that is same as the error correcting code applied to the original data in step S501. For example, if step S501 is performed by applying an erasure code instead of applying a general error correcting code, the processor 112 may restore the entire data using a predetermined number of partial data stored in the plurality of servers.

Figure 6:
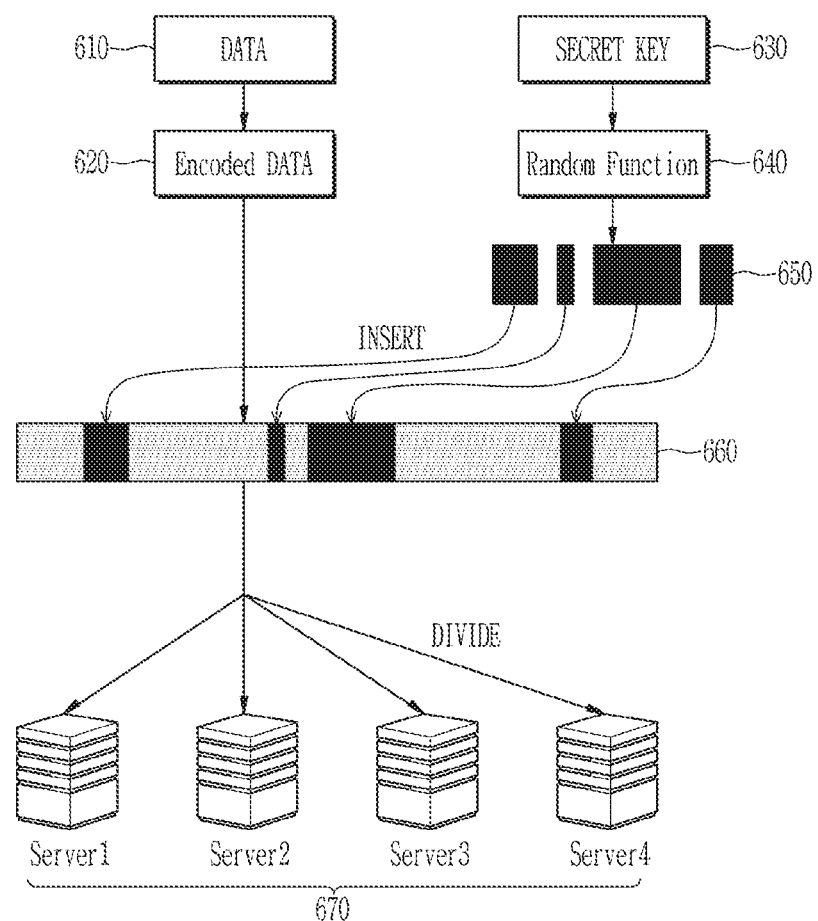
FIG. 6 shows the process for securing data according to an exemplary embodiment of the present invention.

FIG. 6 shows the process for securing data according to an exemplary embodiment of the present invention.

As shown in FIG. 6, terminal 110 may generate encoded data 620 by obtaining data 610, and encoding the data 610 (e.g., applying an error correcting code).

The terminal 110 may generate a plurality of noise pieces 650 by using a pseudo-random number generating function 640 using a secret key 630.

Then, the terminal 110 may insert the noise pieces 650 into the encoded data 620.

Finally, the terminal 110 may divide the encoded data 660 where the noise pieces are inserted into a plurality of divided data to transmit them to each of servers 670. In the dividing operation, the terminal 110 may divide the plurality of partial data of the encoded data 660 in an originally arranged order and transmit them to servers, however, in the present invention, regardless of the originally arranged order, the terminal 110 may randomly divide them and transmit them to each server 670.

According to an exemplary embodiment of the present invention, digital information is divided into small pieces, like a document shredder, and the data is stored dividedly in a plurality of locations, so that it is possible to prevent all data from being restored when an attacker obtains a part of the divided data, and a legitimate user can restore the original data accurately even if some divided data is damaged, such that it is possible to provide confidentiality and resilience of the entire data.

In addition, by not using the data encryption technique, efficient data polymorphic dispersion technology can be provided to minimize the amount of calculation required to secure data.

Although the present invention has been described in detail in the foregoing specification, the scope of the present invention is not limited to the embodiments. For example, in the foregoing description, various variations and modifications of the art also belong to the scope of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for securing data, comprising:
   a memory;
   a processor configured to:
      partition original data stored in the memory into a plurality of partial data,
      obtain a secret key stored in the memory and generate a pseudo-random number using the secret key,
      generate a plurality of divided data by randomly determining positions of each of the plurality of partial data within the original data using the pseudo-random number, and
      replace positions of different partial data among the plurality of partial data; and
   a communication interface configured to transmit each of the plurality of divided data to each of a plurality of servers, respectively,
   wherein the partitioning of the original data comprises obtaining encoded data by applying an error correcting code (ECC) to the original data, generating a plurality of noise pieces using the secret key, randomly inserting the noise pieces into the encoded data, and partitioning the encoded data into a plurality of encoded partial data, and
   wherein the generating of the plurality of divided data comprises generating the plurality of divided data by randomly determining a position of the plurality of encoded partial data.

2. The apparatus of claim 1, wherein the processor is further configured to generate a noise string by using the secret key, and determine positions at which the noise pieces are to be inserted into the encoded data and values of the noise pieces based on the noise string.

3. The apparatus of claim 1, wherein the communication interface is further configured to receive the plurality of divided data from the plurality of servers, and
   wherein the processor is further configured to restore positions of the plurality of partial data included in the plurality of divided data to original positions within the original data.

4. The apparatus of claim 3, wherein the processor is further configured to remove the plurality of noise pieces from the plurality of divided data, upon receiving the plurality of divided data from the plurality of servers, by using the secret key.

* * * * *